US011113952B2

(12) United States Patent
Tournier et al.

(10) Patent No.: US 11,113,952 B2
(45) Date of Patent: Sep. 7, 2021

(54) MACHINE LEARNING MOTION SENSING WITH AUXILIARY SENSORS

(71) Applicant: Alarm.com Incorporated, Tysons, VA (US)

(72) Inventors: Glenn Tournier, Vienna, VA (US); Alexander Lawrence Reeder, Arlington, VA (US); Donald Gerard Madden, Columbia, MD (US); Allison Beach, Leesburg, VA (US); David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/861,001

(22) Filed: Apr. 28, 2020

(65) Prior Publication Data

US 2020/0342748 A1 Oct. 29, 2020

Related U.S. Application Data

(60) Provisional application No. 62/839,815, filed on Apr. 29, 2019.

(51) Int. Cl.
*G08B 29/18* (2006.01)
*G08B 13/19* (2006.01)
(Continued)

(52) U.S. Cl.
CPC .......... *G08B 29/186* (2013.01); *G01J 5/0022* (2013.01); *G01J 5/10* (2013.01);
(Continued)

(58) Field of Classification Search
CPC .............. G08B 13/19; G08B 13/19606; G08B 29/183; G08B 13/191; G01P 13/00; H05B 47/105; H05B 47/13
See application file for complete search history.

(56) References Cited

U.S. PATENT DOCUMENTS 9,013,575 B2 4/2015 Scalisi
9,648,288 B2 5/2017 Kondo et al.
(Continued)

OTHER PUBLICATIONS

PCT International Search Report and Written Opinion in International Application No. PCT/US2020/030423, dated Jul. 20, 2020, 12 pages.

*Primary Examiner* — Mirza F Alam
(74) *Attorney, Agent, or Firm* — Fish & Richardson P.C.

(57) ABSTRACT

A monitoring system that is configured to monitor a property is disclosed. The monitoring system includes a passive infrared (PIR) sensor configured to generate reference PIR data that represents motion within an area of the property; an auxiliary sensor configured to generate auxiliary sensor data that represents an attribute of the area of the property; and a motion sensor device. The motion sensor device is configured to: obtain the reference PIR data; determine that a first set of motion detection criteria is satisfied by the reference PIR data; in response to determining that the first set of motion detection criteria is satisfied by the reference PIR data, obtain the auxiliary sensor data; obtain a second set of motion detection criteria based on the reference PIR data and the auxiliary sensor data; and determine whether the second set of motion detection criteria is satisfied by additional PIR data.

19 Claims, 5 Drawing Sheets

(51) Int. Cl.
*G01J 5/10* (2006.01)
*G01J 5/00* (2006.01)
*G01P 13/00* (2006.01)
*G08B 13/196* (2006.01)

(52) U.S. Cl.
CPC .............. *G01P 13/00* (2013.01); *G08B 13/19* (2013.01); *G08B 13/19695* (2013.01)

(56) References Cited

U.S. PATENT DOCUMENTS

| | | |
|---|---|---|
| 9,674,458 B2 | 6/2017 | Teich et al. |
| 1,000,702 A1 | 6/2018 | Kumar |
| 10,186,124 B1* | 1/2019 | Mullins ............ G08B 13/19682 |
| 2002/0175815 A1* | 11/2002 | Baldwin ............ G08B 13/1645 |
| | | 340/567 |
| 2016/0116343 A1* | 4/2016 | Dixon .................... H05B 47/11 |
| | | 250/342 |
| 2017/0147885 A1* | 5/2017 | Aggarwal ............ G08B 13/194 |
| 2017/0160428 A1* | 6/2017 | Kumar .................. H05B 47/12 |

\* cited by examiner

MACHINE LEARNING MOTION SENSING WITH AUXILIARY SENSORS

CROSS-REFERENCE TO RELATED APPLICATION

This application claims the benefit of U.S. Application No. 62/839,815, filed Apr. 29, 2019, which is incorporated by reference.

TECHNICAL FIELD

This disclosure application relates generally to motion sensing devices.

BACKGROUND

Many properties are equipped with monitoring systems that include sensors and connected system components. Some residential-based monitoring systems include motion sensors that may be configured to detect motion and then indicate to the system that motion has been detected.

SUMMARY

Techniques are described for using machine learning to improve the performance of motion sensors using auxiliary sensors.

Many residents and homeowners equip their properties with monitoring systems to enhance the security, safety, or convenience of their properties. The property monitoring systems can include motion sensors, which can detect movement internal or external to the property.

One example of a motion sensor typically found in motion sensors is Passive Infrared (PIR). PIR sensors can detect moving heat signatures. If a moving heat signature is detected, the motion sensor can cause the property monitoring system to perform an action, such as sending a notification to the resident. PIR sensors can be used in low-power operations.

A detection can be defined as a motion sensor detecting any moving object within its field of view, whether the object is classified as an object of interest or a distractor. An object of interest can be, for example, a human, animal, or vehicle. Moving objects that are not objects of interest can be classified as distractors. A distractor can be, for example, a tree branch, flag, or insect. Manufacturers, installers, and/or residents can classify objects as objects of interest or as distractors. The classification of objects can change over time based on resident preferences, manufacturer updates, machine learning, or any combination of these.

In evaluating the accuracy of a motion sensor, a true positive detection can be defined as a motion sensor accurately detecting the motion of an object of interest. A false positive detection can be defined as a motion sensor detecting the motion of a distractor. A false negative detection can be defined as a motion sensor failing to detect the motion of an object of interest.

In some cases, residents may receive notifications or alerts every time a motion sensor detects motion, whether it is a true positive detection or a false positive detection. The notifications may be sent, for example, to residents' mobile devices or to a control panel of the monitoring system.

Refining the detection of objects of interest by a motion sensor can reduce the number of false positive detections produced by the motion sensor. Reducing the number of false positive detections produced by the motion sensor can reduce traffic of data uploaded to a server to verify data, as well as reduce false alerts provided to users of the motion sensor (e.g., a home or business owner). Reducing false positive detections can also help avoid missing objects of interest, for example, in the case there where there is a limit (e.g., bandwidth limitation) for how often a motion sensor can process a detection (e.g., if the motion sensor can only upload one detection per minute, and it uploads a false positive detection, then an object of interest within the next minute can be missed).

When a user receives notifications for false positive detections, the user may adjust the monitoring system to make broad reductions in sensitivity in order to reduce the number of notifications. Broad reductions in sensitivity can result in an increase in false negative detections. Therefore, a benefit of reducing false positive detections is that it prevents an increase in false negative detections, since the user is less likely to make broad reductions in sensitivity.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
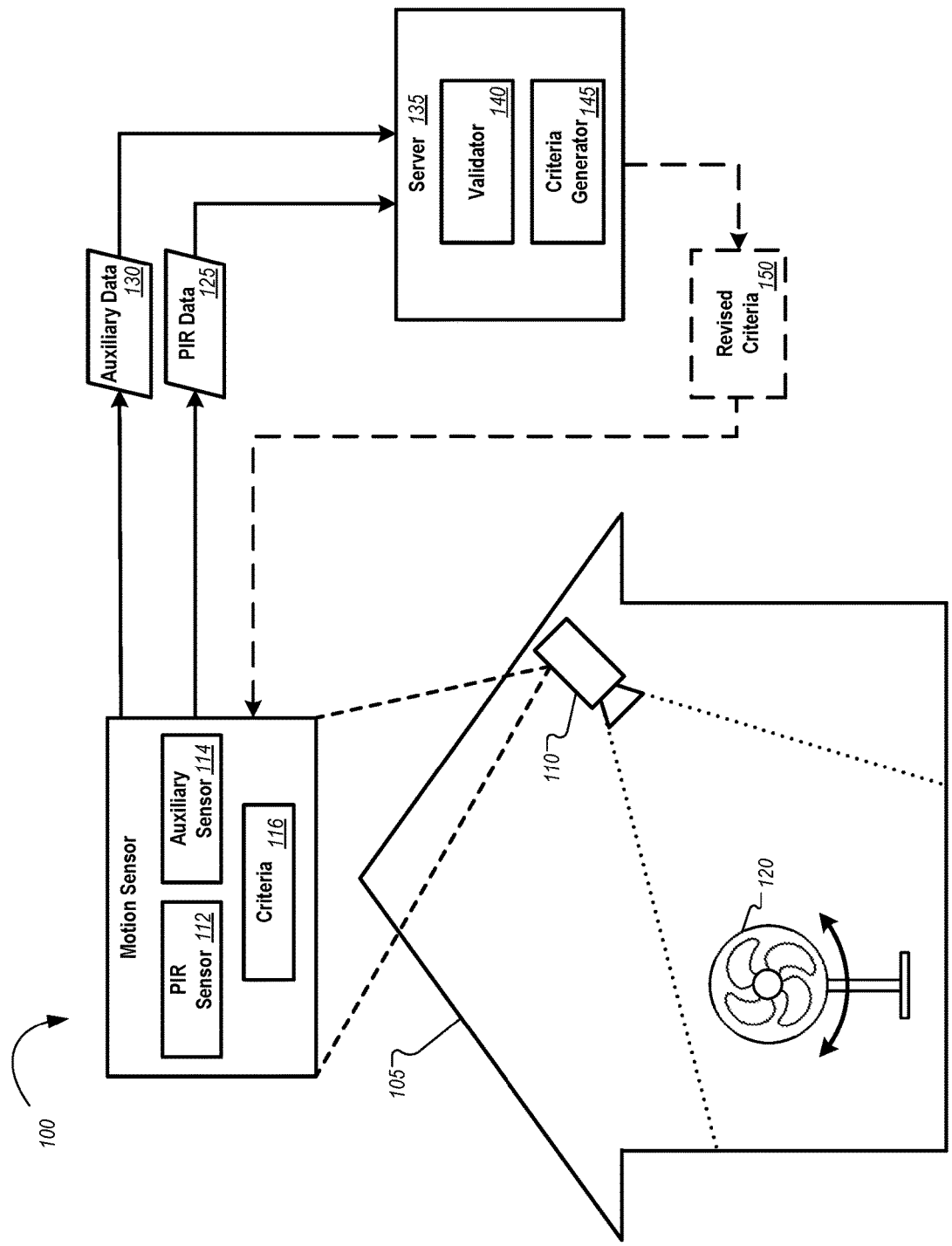
FIG. 1 illustrates an example operating environment for using machine learning motion sensing with auxiliary sensors.

FIG. 1 illustrates an example property monitoring system 100 for using machine learning motion sensing with auxiliary sensors.

In FIG. 1, a property 105 is monitored by a property monitoring system 100. The property 105 can be a home, another residence, a place of business, a public space, or another facility that has one or more motion sensors 110 installed and is monitored by a property monitoring system.

In the example of FIG. 1, a motion sensor 110 is installed inside the property 105. The motion sensor 110 can include, for example, a Passive Infrared (PIR) sensor 112. The PIR sensor 112 can detect moving objects based on the passive detection of heat signatures.

The PIR sensor 112 detects infrared energy emitted or reflected by objects in its field of view. PIR sensors typically include pyroelectric materials, which generate energy when exposed to heat. PIR sensors are energy efficient and can be used in low-power operations, such as battery-powered operations.

The PIR sensor 112 can include one or more elements. When an object, such as a person 115, moves through the field of view of the PIR sensor 112, individual elements within the PIR sensor 112 detect oscillations in incident heat from the object. The oscillations in incident heat cause oscillations in the output voltage of the PIR sensor 112. Changes in the PIR sensor 112 output voltage over time indicate the detection of movement.

Including more elements in the PIR sensor 112 may result in a greater resolution than including fewer elements in the PIR sensor 112. Adding multiple elements to the PIR sensor 112 can enable the identification of object locations within a field of view. For example, with multiple elements, the PIR sensor 112 may be able to identify if an object passes from the left side to the right side of the field of view, or if the object moves toward or away from the PIR sensor 112.

In some implementations, the PIR sensor 112 can be configured to continuously collect infrared energy and detect for objects of interest. In particular, objects of interest can be humans, animals, or vehicles. The PIR sensor 112 may also detect distractors, which are moving objects that are not classified as objects of interest. For example, for outdoor scenarios, the PIR sensor 112 may detect distractors such as moving tree branches and waving flags. For indoor scenarios, the PIR sensor 112 may detect distractors such as pets, warm and cold air from heating, ventilation, and air conditioning (HVAC) systems, and moving appliances, e.g., an oscillating fan 120.

In some implementations, the PIR sensor 112 can be configured to enter a sleep mode at designated times, such as after a certain period of time when no motion is detected. Entering a sleep mode can enable the PIR sensor 112 to save power. In sleep mode, the PIR sensor 112 may continue to passively receive infrared energy. However, the PIR sensor 112 output may be reduced in sleep mode. For example, in sleep mode, certain components of the PIR sensor 112 may shut down, such as the amplifier, analog-to-digital converter, processor, or all of these. In sleep mode, the PIR sensor 112 might not save, amplify, analyze, and/or transmit the collected data.

The PIR sensor 112 can be configured to wake from the sleep mode when a certain event occurs, such as when infrared energy of a certain threshold amplitude passes through the field of view. In another example, the PIR sensor 112 may be configured to wake at designated time intervals to check for movement, such as once per second or three times per second.

The motion sensor 110 includes one or more auxiliary sensors 114. For example, the auxiliary sensors 114 can be light sensors, visible light cameras, infrared cameras, still cameras, video cameras, structured light sensors, time of flight (ToF) sensors, radio detection and ranging (RADAR), Doppler RADAR, light detection and ranging (LIDAR), microphones, or any combination of sensors. The auxiliary sensors 114 can collect additional information from the environment to improve the accuracy of the motion sensor 110.

In some implementations, the motion sensor 110 can use different auxiliary sensors based on various conditions. For example, in a dark environment, a Doppler RADAR may be more useful than a visible light video camera. The motion sensor 110 can determine that the environment is dark based on, for example, light sensors or clocks. When the motion sensor 110 determines that an auxiliary sensor will be activated in a dark environment, the motion sensor 110 can activate the Doppler RADAR instead of the video camera.

In some implementations, the motion sensor 110 can divide the field of view into areas. For example, the areas may be identified by a grid or quadrant system. The areas can be used to correlate data between the PIR sensor 112 and the auxiliary sensor 114. In the example of the auxiliary sensor 114 that is a camera, the motion sensor 110 can map areas of the image in the camera's field of view to areas of the PIR sensor's 112 field of view. If both the PIR sensor 112 and the auxiliary sensor 114 detect an object in the upper left quadrant of the field of view, the motion sensor 110 may determine that the PIR sensor 112 and the auxiliary sensor 114 are detecting the same object.

In the example in FIG. 1, the motion sensor 110 includes the PIR sensor 112 and the auxiliary sensor 114, which is a camera. The camera can record image data from the field of view of the motion sensor 110. In some implementations, the camera can be configured to record continuously. In some implementations, the camera can be configured to record at designated times, such as when triggered by the PIR sensor 112.

The motion sensor 110 can include criteria 116. The criteria 116 can include thresholds and rules that determine whether the motion sensor 110 continues to process the data from a detected object, stops processing data from a detected object, or reports the detection. Changes to the criteria 116 can be made, for example, by the installer, the resident, or through machine learning.

An example criterion for the PIR sensor 112 may be a threshold amplitude of measured differential voltage. In this case, the motion sensor 110 only continues to process the data from objects that produce differential voltages greater than the threshold amplitude.

An example criterion for a camera may be, for example, an object detected within a threshold distance of the motion sensor 110. In this case, the motion sensor 110 only continues to process the data from objects at distances closer than the threshold distance.

The criteria 116 can be combined for the PIR sensor 112 and the auxiliary sensor 114. For example, the criteria 116 may include a rule that the motion sensor 110 continues to process the data from objects that both a) produce differential voltages greater than the threshold amplitude as measured by the PIR sensor 112, and b) are located at distances closer than the threshold distance as measured by the camera.

The sensitivity of the motion sensor 110 can be adjusted by changing the criteria 116. For example, to increase sensitivity of the PIR sensor 112, a user may lower the criterion of threshold differential voltage amplitude. This can cause the PIR sensor 112 to detect objects with smaller heat signatures. For example, the PIR sensor 112 may be configured to detect the motion of humans. If a user increases the sensitivity of the PIR sensor 112 by lowering the threshold differential voltage amplitude, the PIR sensor 112 may also detect the motion of pets.

To increase sensitivity of a camera, a user may lower the detection threshold. This can cause the camera to detect objects at a greater distance. For example, a camera may be configured with a threshold that corresponds to detecting the motion of objects within 20 feet of the motion sensor 110. If a user increases the sensitivity of the camera by lowering the detection threshold, the camera may also detect the motion of objects greater than 20 feet from the motion sensor 110.

In the example of FIG. 1, a fan 120 oscillates within the property 105. The fan 120 is a distractor within the field of view of the motion sensor 110. The PIR sensor 112 detects the motion of the fan 120, and collects and stores PIR data 125. The PIR data can be, for example, a time series of differential voltages between elements of the PIR sensor 112.

When the PIR sensor 112 detects motion, the PIR sensor 112 can enable the auxiliary sensor 114. The auxiliary sensor 114 collects and stores auxiliary data 130. The auxiliary data 130 can be, for example, video image data from a camera.

A validation procedure can be used to evaluate and improve the accuracy of the motion sensor 110. To begin the validation procedure, the motion sensor 110 sends the PIR data 125 and the auxiliary data 130 to a server 135. The server 135 may be, for example, one or more computer systems, server systems, or other computing devices that are configured to process information related to the monitoring system at the property 105. In some implementations, the server 135 is a cloud computing platform.

In some examples, the motion sensor 110 can send the PIR data 125 and the auxiliary data 130 from one detection event to the server 135. In some examples, the motion sensor 110 can send the PIR data 125 and the auxiliary data 130 from multiple detection events to the server 135.

The server 135 receives the PIR data 125 and the auxiliary data 130. The server 135 can use a machine deep learning process to analyze the data and generate revised criteria 150. In some examples, a monitor control unit or other computing system of the monitoring system 100 receives and analyzes the PIR data 125 and the auxiliary data 130.

The server 135 includes a validator 140 and a criteria generator 145. The validator 140 can use the auxiliary data 130 to validate the motion sensor criteria 116. For example, the PIR data 125 may indicate the movement of objects within the field of view of the motion sensor 110. The validator 140 can compare the auxiliary data 130 to the PIR data 125 to correlate, identify and/or verify the detected objects.

In the case where the auxiliary data 130 is image data, the server 135 can process the image data using image detection software. The image detection software may include one or more object models (e.g., human model, animal model, vehicle model) that include information related to a respective object (e.g., human, animal, vehicle). An object model may include information related to, for example, object size/dimensions, locations of one or more features, and movement speed. For example, a human model may include information about average human height and relative locations of a human's head and foot position.

In the example of FIG. 1, the PIR data 125 indicates a moving object within the field of view of the motion sensor 110. The moving object is the oscillating fan 120. The auxiliary data 130 includes image data of the fan 120. The server 135 can process the image data using image detection software, and identify that the object in the auxiliary data 130 is the fan 120.

The validator 140 compares the PIR data 125 to the auxiliary data 130. The validator 140 correlates the moving object, detected by the PIR sensor 112, with the fan 120, identified using image detection software.

In some implementations, the validator 140 can include one or more neural networks and/or deep learning algorithms that may be used to detect and classify objects in the field of view of the motion sensor 110. The validator 140 can classify each verified data set as a true positive detection or a false positive detection. In this example, the validator 140 may classify the detection of the fan 120 as a false positive detection, because the fan 120 is a distractor.

The validator 140 may track the number of false positive and true positive detections. The information from the validator 140 can be sent to the criteria generator 145 to create revised criteria 150 for the motion sensor 110. The criteria generator 145 may, for example, adjust one or more thresholds for detection, create or adjust filters, or create or adjust rules for the motion sensor 110.

In some implementations, the validator 140 can identify, and the criteria generator 145 can correct for, "near misses" using machine learning. A near miss is a true positive detection that is not optimal, e.g. the true positive detection occurs later than expected. For example, if a true positive detection occurs, the validator 140 can analyze image data collected by the auxiliary sensor 114. The validator 140 may determine that the true positive detection was caused by a person walking through the field of view. The validator 140 may determine that when the true positive detection occurred, the person was close to the motion sensor 110 and/or in the middle of the field of view of the motion sensor 110. The validator 140 can determine that the true positive detection was a near miss, because the motion sensor 110 should have detected the person at a greater distance and/or farther from the center of the field of view. Using the machine learning algorithm, the criteria generator 145 can increase sensitivity of the revised criteria 150 in response to the near miss.

The criteria generator 145 may create revised criteria 150 that adjusts parameters for motion detection. These parameters can include the minimum number of samples required, major threshold, minor threshold, number of zero crossings, number of total pulses, number of pulses above major threshold, minimum duration that qualifies as a pulse, and detection time window. Parameters can also include filter selections and cutoff frequencies for high-pass, low-pass, and band-pass filters, analog signal gain, temperature compensation adjustment, active window time, blind time, and bulk IR threshold. The criteria generator 145 may also generate one or more neural networks to run against the time series PIR data 125 from one or more PIR elements.

Because the fan 120 is a distractor, the criteria generator 145 can create revised criteria 150 to reduce or eliminate the detection of the fan 120. For example, the revised criteria 150 may include a filter for the output differential voltage signal generated by the motion of the fan 120. In another example, the revised criteria 150 may block, mask, or use some other means to reduce the detection of objects in the area of the field of view that includes the fan 120.

In some implementations, there may be multiple distractors within the field of view of the motion sensor 110. For example, in outdoor applications, there may be wind chimes, a flag, and a leafy tree within the field of view of the motion sensor 110. Although these objects move, they are not objects of interest to the property monitoring system. Through machine learning, the motion sensor 110 can learn that these objects are distractors that should not trigger detection.

In order to filter out the detection of distractors, the motion sensor 110 can create a model of the scene within the field of view of the motion sensor 110. The model may be two-dimensional or three-dimensional, and can be created, for example, through video analytics. The model can include stationary objects and locations within the scene. For example, the model for an outdoor application may include a porch, a walkway, a sidewalk, a roadway, a tree, and a flagpole.

The model of the scene can be segmented by using horizontal and/or vertical baffles. Over time, the motion sensor 110 can collect segmented background information. The motion sensor 110 can learn through machine learning the objects that are typically present in the background, and identify the objects by their occupied segment of the field of view. The motion sensor 110 can flag these objects as distractors, and mask the corresponding sections of the PIR sensor 112. In some implementations, the signals detected from distractors can be processed as signal noise, and can be subtracted from the PIR output signal.

Once the criteria generator 145 creates the revised criteria 150, the server 135 can send the revised criteria 150 to the motion sensor 110. To complete the validation procedure, the revised criteria 150 replaces the criteria 116.

The revised criteria 150 may vary based on environmental factors such as the time of day, season, weather, and temperature. The criteria generator 145 can determine time of day, season, weather, and temperature based on, for example, light sensors, clocks, thermometers, and/or sources such as the internet. The criteria generator 145 can use this information to create revised criteria 150 specific to various environments. For example, if the season is autumn, and the weather is windy, the criteria generator 145 may create revised criteria 150 to filter out the detection of leaves blowing in the wind. The motion sensor 110 can store the environment-specific criteria and incorporate the environment-specific criteria on a schedule or based on individual scenarios. For example, the motion sensor 110 may use certain criteria on a calm winter day, and may use different criteria on a stormy summer night.

In some implementations, the validation procedure can repeat at designated intervals. In some examples, the validation procedure may occur at time intervals, e.g., once every minute or once every ten minutes. In some examples, the validation procedure may occur at intervals based on an amount of motion detection events. For example, the validation procedure may occur at intervals of, e.g., fifty motion detection events or one hundred motion detection events.

Repeating the validation procedure can improve the accuracy of the motion sensor 110. For example, if the validation procedure produces revised criteria 150 that blocks detection of objects in the area of the field of view that includes the fan 120, objects of interest near the fan 120 may go undetected. During the repeated validation procedure, the validator 140 may identify these false negative detections. The criteria generator 145 can then create revised criteria 150 to improve accuracy, for example, by reducing the size of the blocked or masked area within the field of view.

In some cases, the validation procedure may result in revised criteria 150 that is the same as the criteria 116. For example, if a person enters the field of view of the motion sensor 110, the PIR sensor 112 and the camera can send the PIR data 125 and auxiliary data 130 to the server 135. The validator 140 can use the auxiliary data 130 to verify that the PIR sensor 112 accurately detected the person, and can classify the detection as a true positive detection. Based on the accurate detection, the criteria generator 145 can output revised criteria 150 that is the same as the criteria 116.

In some implementations, the validation procedure can occur when triggered by an event. For example, a triggering event may be the detection of any moving object by the motion sensor 110. Another example of a triggering event may be the absence of detected moving objects. For example, if no moving objects are detected over the course of an hour, the validation procedure can repeat in order to evaluate any false negative detections.

In some implementations, upon installation, the motion sensor 110 may have a training phase. For example, the training phase may be a period of multiple days or weeks. During the training phase, the sensitivity of the PIR sensor 112 can be set higher, and the validation procedure can occur more frequently, compared to normal operation. With a higher sensitivity, the motion sensor 110 can capture more data for the server 135 to analyze, causing more rapid accuracy improvements.

During the training phase, the motion sensor 110 can fine tune itself to the specific installation location through machine learning. Over time, the sensitivity of the PIR sensor 112 can be lowered to reduce false alerts, and the validation procedure can occur less frequently as the motion sensor 110 learns to identify objects of interest and ignore distractors.

In some implementations, the motion sensor 110 may perform scene analysis immediately upon installation. The motion sensor 110 can map areas of the image in the camera's field of view to the elements of the PIR sensor 112. The motion sensor 110 can then mask certain problematic regions including moving objects (e.g. a waving flag) by ignoring certain PIR element differentials.

In some implementations, machine learning with auxiliary sensors can be used during product development of motion sensors. Multiple auxiliary sensors can be added to improve accuracy before installation. For example, in addition to visible light cameras, auxiliary sensors can be sensors such as infrared cameras, structured light sensors, ToF sensors, microphones, light sensors, LIDAR, RADAR, pressure sensors, and gas sensors. In some implementations, during product development, auxiliary sensors can collect data continuously, so that the validators can identify all false positive detections and all false negative detections. Auxiliary data from auxiliary sensors can be used to train motion sensors during product development, with additional training occurring after installation.

Figure 2:
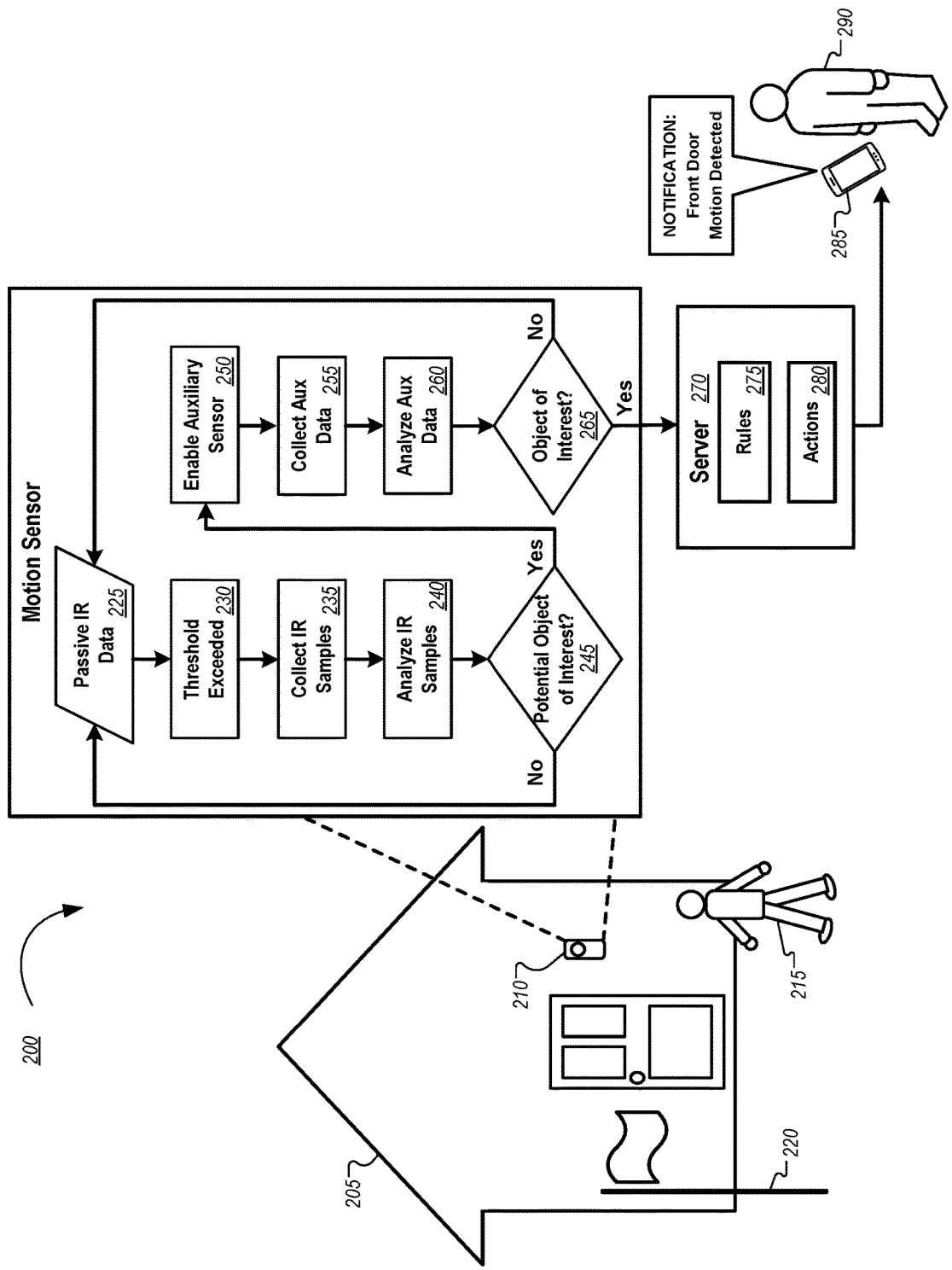
FIG. 2 illustrates an example operating environment for detecting motion using motion sensing with auxiliary sensors.

FIG. 2 illustrates an example operating environment 200 for detecting motion using motion sensing with auxiliary sensors.

In FIG. 2, a property 205 is monitored by a property monitoring system. The property 205 has a motion sensor 210. The motion sensor 210 is installed external to the property 205. The motion sensor 210 is installed near the front door, facing the front yard of the property 205. The motion sensor 210 includes a PIR sensor, such as the PIR sensor 112, and an auxiliary sensor, such as the auxiliary sensor 114. In FIG. 2, the auxiliary sensor is a video camera.

The motion sensor 210 is initially in sleep mode, during which the PIR sensor receives infrared energy, but does not save, amplify, analyze, or transmit the collected data. The auxiliary sensor 114 is initially powered off.

A person 215 walks into the field of view of the motion sensor 210. At approximately the same time, wind causes a flag 220 to wave within the field of view of the motion sensor 210. The walking person 215 is an object of interest, while the waving flag 220 is a distractor. The PIR sensor within the motion sensor 210 collects PIR data 225 from both the person 215 and the flag 220.

Figure 3A:
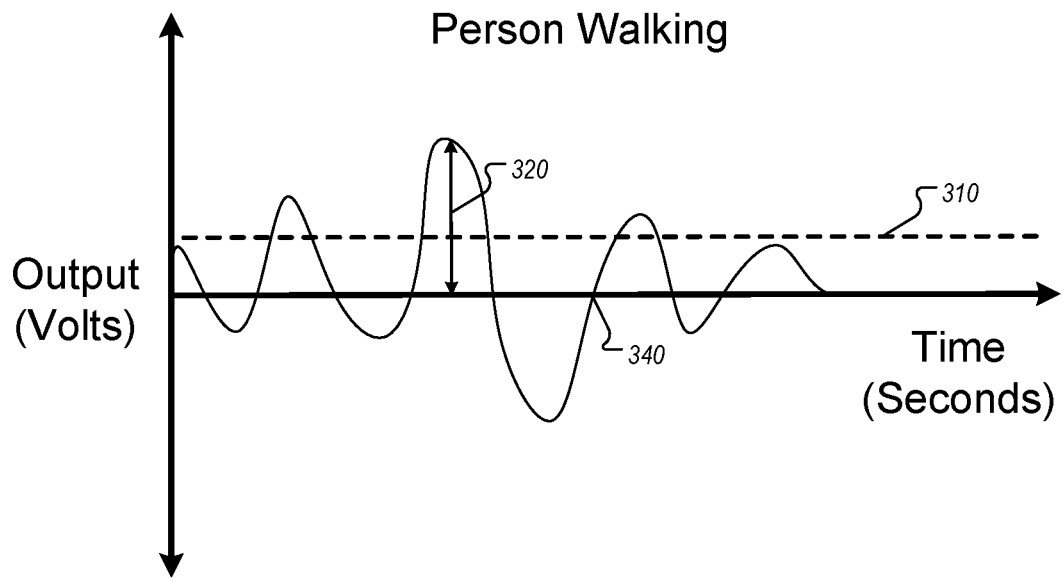
FIGS. 3A and 3B are graphs of example PIR data.
Figure 3B:
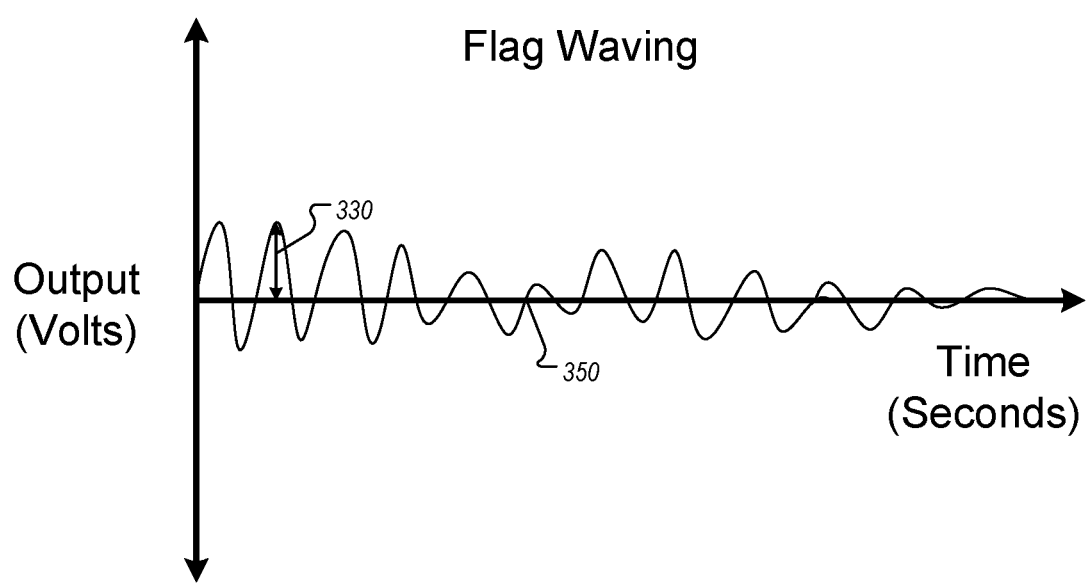

FIGS. 3A and 3B are graphs of example PIR data 225. FIG. 3A shows an example graph of differential output over time for a walking person. FIG. 3B shows an example graph of differential output over time for the waving flag. Differential output is measured in Volts, while time is measured in seconds. Motion sensors can be programmed with a threshold differential voltage output 310, which is compared to the PIR data output.

In FIG. 3A, the IR signal of the person has a maximum amplitude 320. In FIG. 3B, the IR signal of the flag has a maximum amplitude 330. The maximum amplitude 320 from the person is larger than the maximum amplitude 330 from the flag. This is due to the person's larger heat signature, compared to the flag. The threshold differential voltage output 310 may be set to a value that is lower than the maximum amplitude 320 from the person, but higher than the maximum amplitude 330 from the flag.

Referring back to FIG. 2, if the PIR data 225 output exceeds a threshold 230, e.g., threshold differential voltage output 310, the PIR sensor wakes and collects additional IR samples 235. For example, the PIR data 225 from the person 215 may exceed the threshold 230, while the PIR data 225 from the flag 220 might not exceed the threshold 230. However, if the threshold is set lower than the output signal of the flag 220, then the PIR data 225 from the flag 220 will exceed the threshold 230.

The motion sensor 210 analyzes the IR samples 240. The motion sensor 210 can analyze the IR samples for one or more parameters. For example, the motion sensor 210 can analyze the IR samples for parameters such as maximum output voltage, average output voltage, number of zero crossings, number of pulses, pulse duration, and pulse shape.

FIG. 3A and FIG. 3B illustrate several of the IR sample parameters that the motion sensor 210 can evaluate. For example, over the given timeframe, the IR signal in FIG. 3A has fewer zero crossings 340 compared to the zero crossings 350 in FIG. 3B. The IR signal from in FIG. 3A also has fewer pulses, but each of longer duration, compared to FIG. 3B. Over time, through the validation procedure and using machine learning, the motion sensor 210 can learn to differentiate the IR signals from different objects based on these, and other, signal characteristics.

At certain temperature ranges, PIR sensors may not be able to confidently discriminate between certain objects. The motion sensor 210 can include temperature sensors, or can receive weather data input, for example from the internet. When the temperature of the environment falls within problematic temperature ranges, the motion sensor 210 can apply additional analysis to the IR data. For example, the motion sensor 210 may run one or more neural networks against the IR data to improve the accuracy of object discrimination.

Referring to FIG. 2, based on analyzing the IR samples 240, the motion sensor 210 can determine if there is a potential object of interest 245. If the motion sensor 210 determines that there is a potential object of interest 245, the motion sensor 210 can enable the one or more auxiliary sensors 250. If the motion sensor 210 determines that there is not a potential object of interest 245, the motion sensor 210 can return to sleep mode, collecting PIR data 225.

In some implementations, the determination of the potential object of interest 245 is a true/false determination. In other implementations, the determination of the potential object of interest 245 is based on confidence values. For example, the motion sensor 210 may determine a confidence value of 60% based on analyzing IR samples 240. The motion sensor 210 can determine to enable certain auxiliary sensors 250 based on the confidence value. The motion sensor 210 can determine which auxiliary sensors to enable based on factors such as the amount of power consumed by the auxiliary sensors, and the accuracy of the auxiliary sensors. For example, a Doppler RADAR may consume less power than a video camera, but may be less accurate than a video camera. The motion sensor 210 may determine to activate the Doppler RADAR when the confidence value is high, e.g., a confidence value greater than 70%. The motion sensor 210 may determine to activate the camera when the confidence value is lower, e.g., a confidence value greater than 30% but less than 70%. By intelligently selecting the auxiliary sensors needed to confirm detection, the motion sensor 210 can improve accuracy while saving power and data storage.

When the auxiliary sensor is enabled 250, the auxiliary sensor collects auxiliary data 255. The motion sensor 210 then analyzes the auxiliary data 260. Based on analyzing the auxiliary data 260, the motion sensor 210 determines if there is an object of interest 265. There is an object of interest if the auxiliary data confirms the PIR sensor detection.

For example, the PIR sensor may determine, based on analyzing IR samples 240, that there are two potential objects of interest 245, i.e., the person 215 and the flag 220. The motion sensor 210 enables the auxiliary sensor 250, which is a video camera. The auxiliary sensor collects auxiliary data 255, which is image data from the video camera. The image data from the video camera may show both the person 215 and the flag 220. The motion sensor 210 analyzes the auxiliary data 260, using, for example, image detection software. The motion sensor 210 can identify the image of the person 215, and determine that the person 215 is an object of interest 265. The motion sensor 210 can identify the image of the flag 220, and determine that the flag 220 is not an object of interest, because the flag 220 is a distractor.

If the motion sensor 210 determines that there is an object of interest 265, the motion sensor 210 can transmit the data to a server 270. If the motion sensor 210 determines that there is not an object of interest, the motion sensor 210 can return to sleep mode, collecting PIR data 225.

The server 270 receives indications of the object of interest 265 from the motion sensor 210. The indications of the object of interest 265 can include, for example, a true/false signal that there is an object of interest, a confidence value regarding the presence of an object of interest, the PIR data, the auxiliary data, or all of these.

The server 270 can use rules 275 to determine actions 280. For example, a rule 275 may state that when any object of interest is detected, the server 270 takes the action 280 of sending a notification to a mobile device 285 of a user 290. The rules 275 and actions 280 can be set, for example, by the installer or the user 290 of the property monitoring system.

In some implementations, the user 290 can provide input and/or feedback to the property monitoring system to improve the performance of the motion sensor 210. For example, if the motion sensor 210 detects an object of interest based on the movement of the flag 220, the user 290 can submit feedback that the flag 220 is a distractor. The server 270 can incorporate the feedback into the training process to improve the accuracy of motion detection.

In another example, the motion sensor 210 may detect and confirm an object of interest based on the movement of the person 215. The user 290 may provide feedback indicating that the person 215 is a distractor because the person 215 is too far away from the property 205. The server 270 can incorporate the feedback into the training process to filter for objects of interest only within certain areas of the motion sensor's 210 field of view.

In some implementations, the property monitoring system can vary the frequency of performing the validation procedure based on user feedback. For example, if a user provides feedback indicating false negative detections or false positive detections, the property monitoring system can increase the frequency of the validation procedure in order to improve motion sensor performance.

In some implementations, some or all data analysis can be performed by various components of the property monitoring system. For example, IR data and/or auxiliary data can be analyzed by any server, computer, and/or cloud-based computing platform connected to the property monitoring system.

Figure 4:
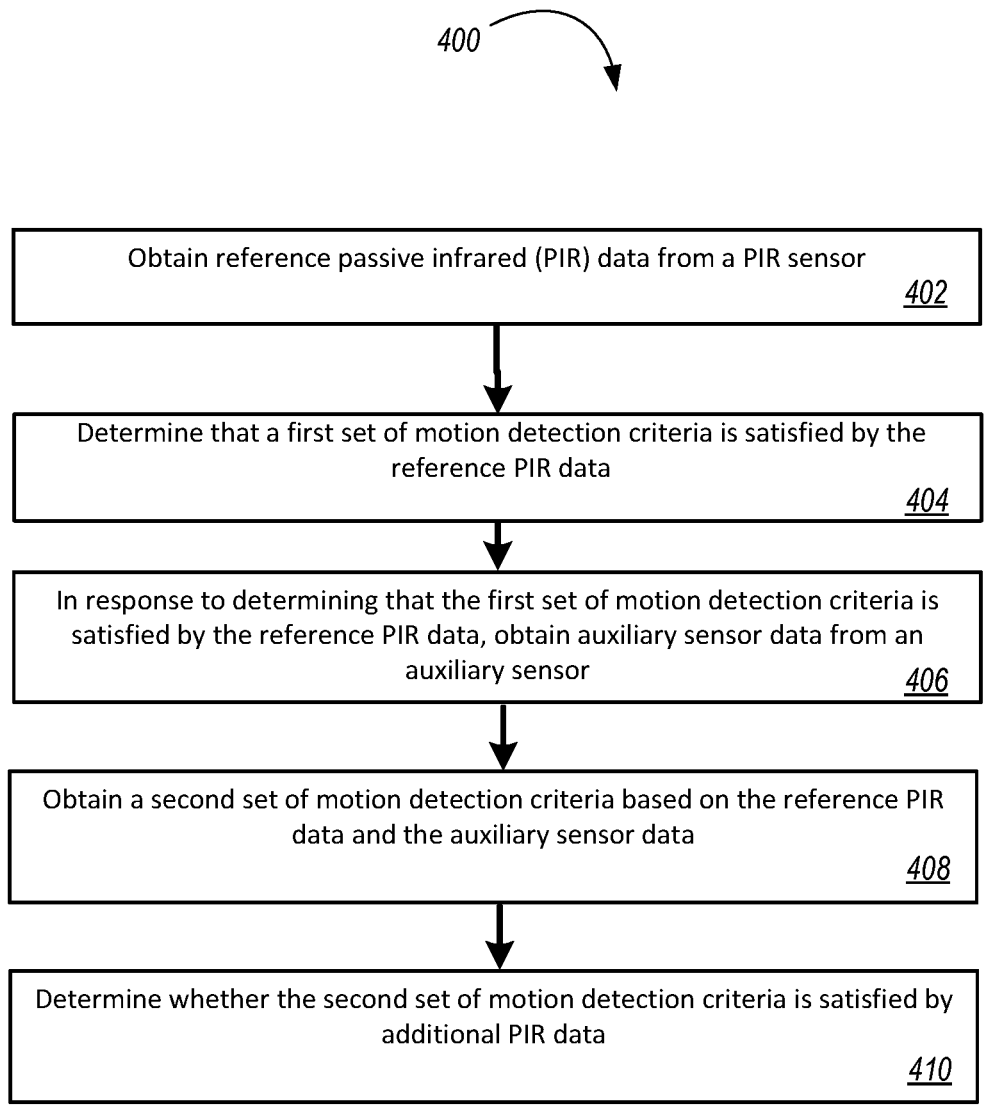
FIG. 4 is a flow diagram of an example process for machine learning motion sensing with auxiliary sensors.

FIG. 4 is a flow chart illustrating an example of a process 400 for machine learning motion sensing with auxiliary sensors. The process 400 can be performed by a motion sensor device, e.g., the motion sensor 110, a monitoring server, e.g., the server 135, a monitor control unit, or another computing system of a monitoring system.

Briefly, process 400 includes obtaining reference PIR data from a PIR sensor (402), determining that a first set of motion detection criteria is satisfied by the reference PIR data (404), in response to determining that the first set of motion detection criteria is satisfied by the reference PIR data, obtaining auxiliary sensor data from an auxiliary sensor (406), obtaining a second set of motion detection criteria based on the reference PIR data and the auxiliary sensor data (408), and determining whether the second set of motion detection criteria is satisfied by additional PIR data (410).

The process 400 includes obtaining reference PIR data from a PIR sensor (402). The data can be collected by, for example, the PIR sensor 112 of FIG. 1. The PIR sensor 112 detects moving heat signatures within its field of view and generates reference PIR data, e.g., PIR data 225, that represents motion within an area of the property. The area of the property can be, for example, an indoor area of the property, an outdoor area of the property, or a combined indoor/outdoor area of the property. For example, the PIR data 225 can represent motion of the person 215 and the flag 220 in an area outside of the property 205. In some examples, the motion sensor device, e.g., the motion sensor 110, includes the PIR sensor 112.

The process 400 includes determining that a first set of motion detection criteria is satisfied by the reference PIR data (404). The criteria can be, for example, the criteria 116 in FIG. 1. The criteria 116 can be based on any combination of parameters of the PIR output signal, such as the minimum number of samples required, major threshold, minor threshold, number of zero crossings, number of total pulses, number of pulses above major threshold, minimum duration that qualifies as a pulse, and detection time window. In some examples, the criteria 116 can include a threshold PIR differential voltage, a threshold distance from the motion sensor 110, or both. Parameters can also include filter selections and cutoff frequencies for high-pass, low-pass, and band-pass filters, analog signal gain, temperature compensation adjustment, active window time, blind time, and bulk IR threshold. The criteria may also be based on one or more neural networks run against the time series IR data.

Determining that a first set of motion detection criteria is satisfied can include determining that the PIR data 225 exceeds a threshold differential voltage output 310. For example, the PIR data 225 may have a maximum differential voltage output of six volts and the motion sensor 210 can determine that the PIR data 225 exceeds a threshold differential voltage output 310 of five volts.

Determining that a first set of motion detection criteria is satisfied can include determining that a number of zero crossings within a particular window of time is less than a maximum number of zero crossings. For example, a maximum number of zero crossings may be ten zero crossings per second. The motion sensor 210 can determine that the first set of motion detection criteria is satisfied by determining that the PIR data 225 includes six zero crossings within a window of time of one second.

Determining that a first set of motion detection criteria is satisfied can include determining that a total number of pulses exceeds a minimum number of pulses, with each pulse duration greater than a minimum pulse duration. For example, the minimum total number of pulses may be three pulses, and the minimum pulse duration may be 0.2 seconds. The motion sensor 210 can determine that the first set of motion detection criteria is satisfied by determining that the PIR data 225 includes a total of five pulses each having a duration of 0.3 seconds.

The process 400 includes, in response to determining that the first set of motion detection criteria is satisfied by the reference PIR data, obtaining auxiliary sensor data from an auxiliary sensor (406). The image can be captured by, for example, the auxiliary sensor 114 of FIG. 1. The auxiliary sensor 114 generates auxiliary sensor data that represents an attribute of the area of the property. For example, the auxiliary sensor 114 can be a camera that generates visual image data of the oscillating fan 120. In some examples the motion sensor 110 can include the auxiliary sensor 114. In some examples, the auxiliary sensor 114 can include one or more of a light sensor, a structured light sensor, a time of ToF sensor, a RADAR sensor, a Doppler RADAR sensor, a LIDAR sensor, or a microphone.

In some examples, the auxiliary sensor 114 is powered off, and in response to determining that the first set of motion detection criteria is satisfied by the reference PIR data, the motion sensor 110 powers on the auxiliary sensor 114 to generate the auxiliary sensor data. For example, the auxiliary sensor 114 can remain powered off in order to save power. In response to determining that motion detected by the PIR sensor 112 satisfied the first set of motion criteria the motion sensor 110 can turn on the auxiliary sensor 114, e.g., to collect image data of the area of the property where the motion was detected.

In some examples, the PIR sensor 112 and the auxiliary sensor 114 have overlapping fields of view. The motion sensor 110 can be configured to map the auxiliary sensor data from an area of the auxiliary sensor field of view to a corresponding area of the PIR sensor field of view. For example, the oscillating fan 120 may be positioned in a lower right side area of the PIR sensor field of view. The oscillating fan 120 may be positioned in a lower center area of the auxiliary sensor field of view. The motion sensor 110 can be calibrated and configured to map the lower right side area of the PIR sensor field of view to the lower center area of the auxiliary sensor field of view. In this way the motion sensor 110 can map motion of the oscillating fan 120 with an image of the oscillating fan 120, to determine that the source of detected motion is the oscillating fan.

In some examples, the motion sensor 110 can include or communicate with multiple auxiliary sensors. The motion sensor 110 can receive data indicating an environmental condition at the property. Based on the environmental condition at the property the motion sensor 110 can select to obtain auxiliary sensor data from one or more of the multiple auxiliary sensors. For example, the motion sensor 110 can receive data indicating an ambient light level near the motion sensor 110. When the ambient light level is greater than a threshold value, e.g., ten lux, the motion sensor 110 can be configured to select to obtain auxiliary sensor data from a visible light camera. When the ambient light level is greater than the threshold value, the motion sensor 110 can be configured to select to obtain auxiliary sensor data from an infrared camera.

The process 400 includes obtaining a second set of motion detection criteria based on the reference PIR data and the auxiliary sensor data (408). The second set of motion detection criteria can be, for example, the revised criteria 150 in FIG. 1. The second set of motion detection criteria can be determined through a validation procedure that uses machine learning. A monitoring server, e.g., the server 135, can receive, from the motion sensor 110, the PIR data 125 and the auxiliary data 130. The server 135 can determine the second set of motion detection criteria, e.g., the revised criteria 150, based on the PIR data 125 and the auxiliary data 130. The motion sensor 110 can obtain the revised criteria 150 from the server 135.

For example, the criteria 116 may include a threshold differential voltage output of seven volts. The PIR data 125 may include a differential voltage output of eight volts, and the auxiliary data 130 may include an image of the oscillating fan 120. Based on the PIR data 125 and the auxiliary data 130, the server 135 can determine the revised criteria 150, e.g., with a higher threshold differential voltage output of nine volts. Raising the threshold can reduce false motion detections caused by the oscillating fan 120. The motion sensor 110 can receive the revised criteria 150 from the server 135. The motion sensor 110 can then use the revised criteria 150 to evaluate additional PIR data.

In some examples, determining the second set of motion detection criteria based on the reference PIR data and the auxiliary sensor data includes analyzing the auxiliary sensor data to classify an object of interest in the area of the property and analyzing the PIR data to determine that a detected motion does not correspond to the object of interest. In response to determining that the detected motion does not correspond to the object of interest, the server can determine the second set of motion detection criteria based on the first set of motion detection criteria.

For example, the motion sensor 210 can analyze the auxiliary data 255 to classify the person 215 as an object of interest. The motion sensor 210 can analyze the IR samples 235 to determine that detected motion of the flag 220 does not correspond to the person 215. In response to determining that the detected motion of the flag 220 does not correspond to the person 215, the server 270 can determine the revised criteria 150.

In some examples, determining the second set of motion detection criteria can include analyzing the auxiliary sensor data to generate a model of a scene within a field of view of the PIR sensor. The model can include two or more spatial segments. The server can classify an object within the scene as a background object and identify an associated spatial segment where the background object is located in the scene. The server can reduce a motion detection sensitivity of the associated spatial segment.

For example, the server 270 can generate a model of a scene within a field of view of the motion sensor 210. The server 135 can classify the flag 220 as a background object and identify an associated spatial segment where the flag 220 is located in the scene. The server 135 can then determine revised criteria 150 with a reduced motion detection sensitivity of the spatial segment associated with the flag 220.

In some examples, determining the second set of motion detection criteria based on the reference PIR data and the auxiliary sensor data includes analyzing the auxiliary sensor data to classify an object of interest in the area of the property and determine an expected time of motion detection of the object of interest. The server can analyze the reference PIR data to determine a time of motion detection of the object of interest and determine that the time of motion detection of the object of interest was later than the expected time of motion detection. In response to determining that the time of motion detection of the object of interest was later than the expected time of motion detection, the server can determine the second set of motion detection criteria based on the first set of motion detection criteria.

For example, the server 270 can analyze the auxiliary sensor data to classify the person 215 as an object of interest and can determine an expected time of motion detection of the person 215 was 2:05:15 pm. The server 270 can analyze the reference PIR data to determine that the time of motion detection of the person 215 was 2:05:18 pm. The server 270 can determine that the time of motion detection of the person 215 was three seconds later than expected. In response to determining that the time of motion detection of the person 215 was later than expected, the server 270 can determine revised criteria 150.

In some examples, the monitor control unit is configured to obtain environmental data indicating an environmental condition at the property. The monitor control unit can determine the second set of motion detection criteria based on the environmental data. The second set of motion detection criteria can be designated for use at the environmental condition. The environmental condition can be, for example, a temperature, a time of day, a day of year, a season, or a weather condition at the property.

For example, the criteria generator 145 of the server 135 can obtain environmental data indicating that a temperature at the property at approximately the time of motion detection was 50° F. The server 135 can determine the revised criteria 150 based on the temperature of 50° F. The revised criteria 150 can be designated for use at the temperature of 50° F., or at a range of temperatures near 50° F.

In some examples, determining the second set of motion detection criteria can include setting one or more thresholds, one or more filters, or one or more rules. In some examples, determining the second set of motion detection criteria can include setting a motion detection sensitivity in one or more segments of a field of view of the PIR sensor. For example determining the revised criteria 150 can include setting a threshold differential voltage output, e.g., six volts, or setting a threshold detection distance from the motion sensor 210, e.g., fifteen feet. Determining the revised criteria can also include setting a motion detection sensitivity for one or more spatial segments of the field of view of the motion sensor, e.g., reducing sensitivity for one or more spatial segments that correspond to a location of a background object such as the flag 220.

The process 400 includes determining whether the second set of motion detection criteria is satisfied by additional PIR data (410). For example, the motion sensor 110 can obtain sampled PIR data from the PIR sensor 112. The sampled PIR data can include time-varying characteristics of the detected motion. The motion sensor 110 can analyze the sampled PIR data to identify potential object of interest. In some examples, the PIR sensor is configured to generate the reference PIR data in a sleep mode, and in response to determining that the first set of motion detection criteria is satisfied by the reference PIR data, the motion sensor device wakes the PIR sensor from the sleep mode to generate the sampled PIR data. For example, the PIR sensor may remain in a sleep mode until detected motion of a certain threshold amplitude passes through the field of view of the PIR sensor.

In some examples, the motion sensor 210 can determine whether the second set of motion detection criteria is satisfied by additional PIR data. For example, after receiving the revised criteria 150, the PIR sensor may collect additional PIR data representing movement of an object at the property 105. The motion sensor 110 can evaluate the additional PIR data using the revised criteria 150. The motion sensor 210 can send a signal to the server 135 indicating that motion was detected. The server 135 can then provide an indication that motion occurred, e.g., the notification provided to the mobile device 285 of the user 290.

Determining whether the second set of motion detection criteria is satisfied by additional PIR data can include selecting the second set of motion detection criteria based on an environmental condition at the property. The motion sensor device can obtain environmental data indicating an environmental condition at the property. The motion sensor device can select the second set of motion detection criteria that is designated for use at the environmental condition.

For example, the motion sensor 110 can obtain environmental data indicating a temperature at the property of 70° F. The motion sensor 110 can select the revised criteria 150 that is designated for use at 70° F., or at a range of temperatures that includes 70° F.

Figure 5:
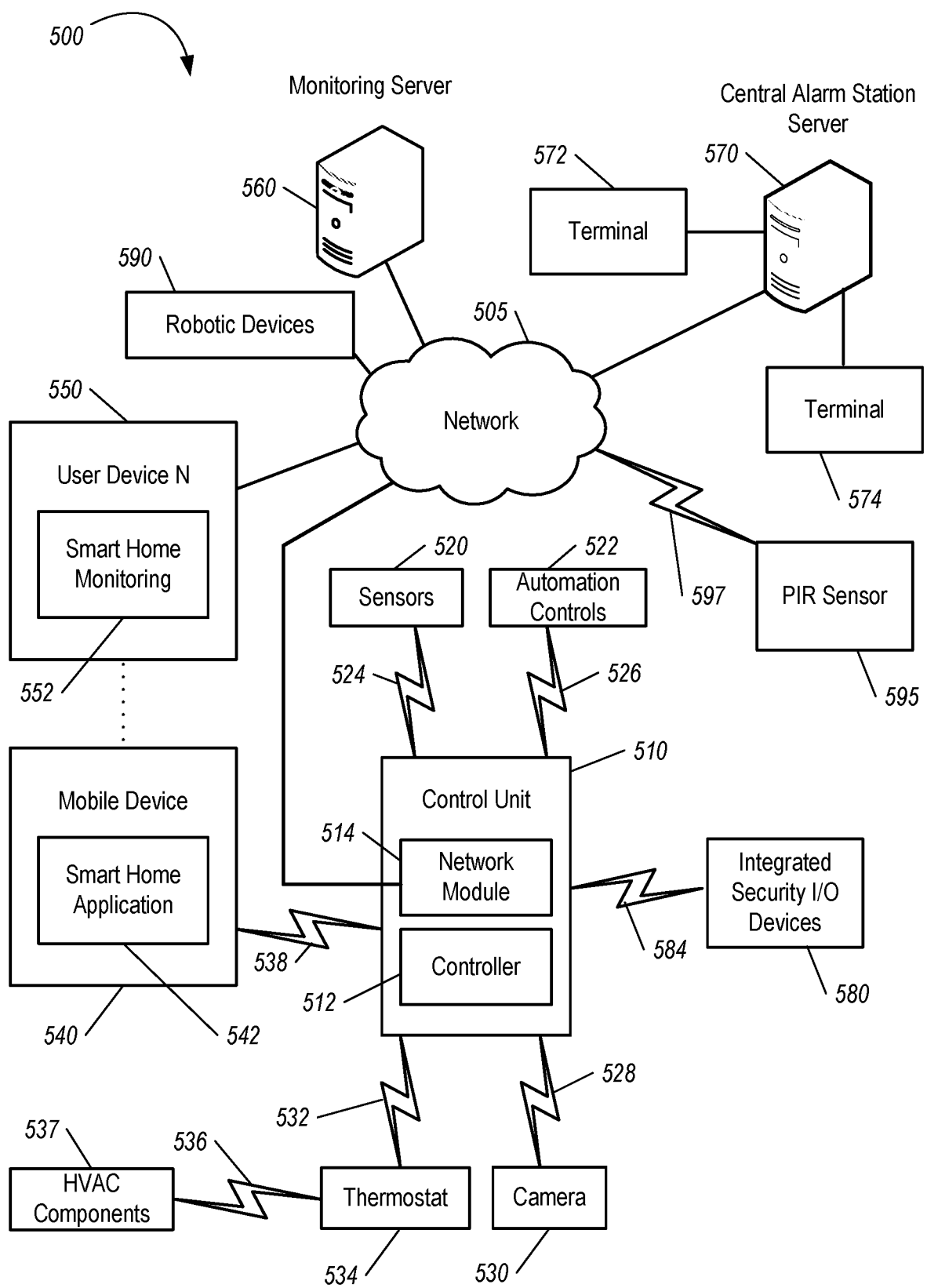
FIG. 5 is a diagram illustrating an example of a home monitoring system.

FIG. 5 is a diagram illustrating an example of a home monitoring system 500. The monitoring system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 520 can also include a radio-frequency identification (RFID) sensor that identifies a particular article that includes a pre-assigned RFID tag.

The control unit 510 communicates with the home automation controls 522 and a camera 530 to perform monitoring. The home automation controls 522 are connected to one or more devices that enable automation of actions in the home. For instance, the home automation controls 522 may be connected to one or more lighting systems and may be configured to control operation of the one or more lighting systems. In addition, the home automation controls 522 may be connected to one or more electronic locks at the home and may be configured to control operation of the one or more electronic locks (e.g., control Z-Wave locks using wireless communications in the Z-Wave protocol). Further, the home automation controls 522 may be connected to one or more appliances at the home and may be configured to control operation of the one or more appliances. The home automation controls 522 may include multiple modules that are each specific to the type of device being controlled in an automated manner. The home automation controls 522 may control the one or more devices based on commands received from the control unit 510. For instance, the home automation controls 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or home monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the home automation controls 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560.

The system 500 also includes thermostat 534 to perform dynamic environmental control at the home. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a home and/or environmental data at a home, e.g., at various locations indoors and outdoors at the home. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534. In some implementations, the thermostat 534 is controlled via one or more home automation controls 522.

A module 537 is connected to one or more components of an HVAC system associated with a home, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

The system 500 further includes one or more integrated security devices 580. The one or more integrated security devices may include any type of device used to provide alerts based on received sensor data. For instance, the one or more control units 510 may provide one or more alerts to the one or more integrated security input/output devices 580. Additionally, the one or more control units 510 may receive one or more sensor data from the sensors 520 and determine whether to provide an alert to the one or more integrated security input/output devices 580.

The sensors 520, the home automation controls 522, the camera 530, the thermostat 534, and the integrated security devices 580 may communicate with the controller 512 over communication links 524, 526, 528, 532, 538, and 584. The communication links 524, 526, 528, 532, 538, and 584 may be a wired or wireless data pathway configured to transmit signals from the sensors 520, the home automation controls 522, the camera 530, the thermostat 534, and the integrated security devices 580 to the controller 512. The sensors 520, the home automation controls 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 538, and 584 may include a local network. The sensors 520, the home automation controls 522, the camera 530, the thermostat 534, and the integrated security devices 580, and the controller 512 may exchange data and commands over the local network. The local network may include 802.11 "Wi-Fi"

wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events generated by the control unit 510. In this example, the monitoring server 560 may exchange electronic communications with the network module 514 included in the control unit 510 to receive information regarding events detected by the control unit 510. The monitoring server 560 also may receive information regarding events from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

The monitoring server 560 may provide various monitoring services to the system 500. For example, the monitoring server 560 may analyze the sensor, image, and other data to determine an activity pattern of a resident of the home monitored by the system 500. In some implementations, the monitoring server 560 may analyze the data for alarm conditions or may determine and perform actions at the home by issuing commands to one or more of the controls 522, possibly through the control unit 510.

The monitoring server 560 can be configured to provide information (e.g., activity patterns) related to one or more residents of the home monitored by the system 500 (e.g., user 108). For example, one or more of the sensors 520, the home automation controls 522, the camera 530, the thermostat 534, and the integrated security devices 580 can collect data related to a resident including location information (e.g., if the resident is home or is not home) and provide location information to the thermostat 534.

The central alarm station server 570 is an electronic device configured to provide alarm monitoring service by exchanging communications with the control unit 510, the one or more user devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more user devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more authorized user devices 540 and 550 are devices that host and display user interfaces. For instance, the user device 540 is a mobile device that hosts or runs one or more native applications (e.g., the home monitoring application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a home monitoring application 552. The home monitoring application 542 refers to a software/firmware program running on the corresponding mobile device that enables the user interface and features described throughout. The user device 540 may load or install the home monitoring application 542 based on data received over a network or data received from local media. The home monitoring application 542 runs on mobile devices platforms, such as iPhone, iPod touch, Blackberry, Google Android, Windows Mobile, etc. The home monitoring application 542 enables the user device 540 to receive and process image and sensor data from the monitoring system.

The user device 540 may be a general-purpose computer (e.g., a desktop personal computer, a workstation, or a laptop computer) that is configured to communicate with the monitoring server 560 and/or the control unit 510 over the network 505. The user device 540 may be configured to display a smart home user interface 552 that is generated by the user device 540 or generated by the monitoring server 560. For example, the user device 540 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Z-wave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 includes the one or more user devices 540 and 550, the sensors 520, the home automation controls 522, the camera 530, and robotic devices 590. The one or more user devices 540 and 550 receive data directly from the sensors 520, the home automation controls 522, the camera 530, and the robotic devices 590, and sends data directly to the sensors 520, the home automation controls 522, the camera 530, and the robotic devices 590. The one or more user devices 540, 550 provide the appropriate interfaces/processing to provide visual surveillance and reporting.

In other implementations, the system 500 further includes network 505 and the sensors 520, the home automation controls 522, the camera 530, the thermostat 534, and the robotic devices 590, and are configured to communicate sensor and image data to the one or more user devices 540 and 550 over network 505 (e.g., the Internet, cellular network, etc.). In yet another implementation, the sensors 520, the home automation controls 522, the camera 530, the thermostat 534, and the robotic devices 590 (or a component, such as a bridge/router) are intelligent enough to change the communication pathway from a direct local pathway when the one or more user devices 540 and 550 are in close physical proximity to the sensors 520, the home automation controls 522, the camera 530, the thermostat 534, and the robotic devices 590 to a pathway over network 505 when the one or more user devices 540 and 550 are farther from the sensors 520, the home automation controls 522, the camera 530, the thermostat 534, and the robotic devices 590.

In some examples, the system leverages GPS information from the one or more user devices 540 and 550 to determine whether the one or more user devices 540 and 550 are close enough to the sensors 520, the home automation controls 522, the camera 530, the thermostat 534, and the robotic devices 590 to use the direct local pathway or whether the one or more user devices 540 and 550 are far enough from the sensors 520, the home automation controls 522, the camera 530, the thermostat 534, and the robotic devices 590 that the pathway over network 505 is required.

In other examples, the system leverages status communications (e.g., pinging) between the one or more user devices 540 and 550 and the sensors 520, the home automation controls 522, the camera 530, the thermostat 534, and the robotic devices 590 to determine whether communication using the direct local pathway is possible. If communication using the direct local pathway is possible, the one or more user devices 540 and 550 communicate with the sensors 520, the home automation controls 522, the camera 530, the thermostat 534, and the robotic devices 590 using the direct local pathway. If communication using the direct local pathway is not possible, the one or more user devices 540 and 550 communicate with the sensors 520, the home automation controls 522, the camera 530, the thermostat 534, and the robotic devices 590 using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "away" state, but set not to capture images when the alarm system is armed in a "home" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The system 500 further includes a motion sensor 595 in communication with the control unit 510 through a communication link 597, which similarly to as described above in regards to communication links 524, 526, 528, 532, 538, and 584, may be wired or wireless and include a local network. The motion sensor 595 may be the indoor motion sensor 110 and the monitoring server 560 may be the server 135.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
a passive infrared (PIR) sensor that has a first field of view and is configured to generate reference PIR data that represents motion within an area of the property;
an auxiliary sensor that has a second field of view and is configured to generate auxiliary sensor data that represents an attribute of the area of the property, wherein the first field of view overlaps with the second field of view;
a motion sensor device configured to:
obtain the reference PIR data from the PIR sensor;
determine that a first set of motion detection criteria is satisfied by the reference PIR data;
in response to determining that the first set of motion detection criteria is satisfied by the reference PIR data, activate the auxiliary sensor to cause the auxiliary sensor to generate the auxiliary sensor data;
obtain the auxiliary sensor data from the auxiliary sensor;
map the auxiliary sensor data from an area of the second field of view to a corresponding area of the first field of view;
identify, based on the auxiliary sensor data mapped from the area of the second field of view to the corresponding area of the first field of view, an object that caused the motion detection within the area of the property;
obtain a second set of motion detection criteria based on the reference PIR data and the identified object that caused the motion detection within the area of the property; and
determine whether the second set of motion detection criteria is satisfied by additional PIR data.

2. The monitoring system of claim 1, comprising a monitor control unit configured to
determine the second set of motion detection criteria based on the reference PIR data and the identified object that caused the motion detection within the area of the property.

3. The monitoring system of claim 1, wherein the auxiliary sensor comprises one or more of an infrared camera or a visible light camera, and the auxiliary sensor data comprises one or more images of the area of the property.

4. The monitoring system of claim 1, wherein the auxiliary sensor comprises one or more of a light sensor, a structured light sensor, a time of flight sensor, a RADAR sensor, a Doppler RADAR sensor, a LIDAR sensor, or a microphone.

5. The monitoring system of claim 1, wherein the PIR sensor is configured to generate the reference PIR data in a sleep mode, and
in response to determining that the first set of motion detection criteria is satisfied by the reference PIR data, the motion sensor device wakes the PIR sensor from the sleep mode to generate sampled PIR data.

6. The monitoring system of claim 1, wherein:
the auxiliary sensor is powered off, and
activating the auxiliary sensor comprises powering on the auxiliary sensor to cause the auxiliary sensor to generate the auxiliary sensor data.

7. The monitoring system of claim 1, wherein the first set of motion detection criteria and the second set of motion detection criteria each comprise one or more of a threshold PIR differential voltage or a threshold distance from the motion sensor device.

8. The monitoring system of claim 1 comprising a plurality of auxiliary sensors, wherein activating the auxiliary sensor to cause the auxiliary sensor to generate the auxiliary sensor data comprises:
receiving data indicating an environmental condition at the property;
selecting, for activation, one or more of the plurality of auxiliary sensors based on the environmental condition at the property; and
activating the selected one or more auxiliary sensors to cause the selected one or more auxiliary sensors to generate the auxiliary sensor data.

9. The monitoring system of claim 2, wherein determining the second set of motion detection criteria based on the reference PIR data and the identified object that caused the motion detection within the area of the property comprises:
analyzing the auxiliary sensor data to classify an object of interest in the area of the property;
determining that the identified object that caused the motion detection does not correspond to the object of interest; and
in response to determining that the identified object that caused the motion detection does not correspond to the object of interest, determining the second set of motion detection criteria based on the first set of motion detection criteria.

10. The monitoring system of claim 2, wherein determining the second set of motion detection criteria based on the reference PIR data and the identified object that caused the motion detection within the area of the property comprises:
analyzing the auxiliary sensor data to:
classify the identified object that caused the motion detection as an object of interest; and
determine an expected time of motion detection of the object of interest;
analyzing the reference PIR data to determine a time of motion detection of the object of interest;
determining that the time of motion detection of the object of interest was later than the expected time of motion detection; and
in response to determining that the time of motion detection of the object of interest was later than the expected time of motion detection, determining the second set of motion detection criteria based on the first set of motion detection criteria.

11. The monitoring system of claim 2, wherein the monitor control unit is configured to:
obtain environmental data indicating a particular environmental condition at the property; and
determine the second set of motion detection criteria based on the environmental data, the second set of motion detection criteria being designated for use by the motion sensor device when an environmental condition at the property matches the particular environmental condition.

12. The monitoring system of claim 11, wherein determining whether the second set of motion detection criteria is satisfied by additional PIR data comprises:
obtaining environmental data indicating an environmental condition at the property;
determining that the environmental condition at the property matches the particular environmental condition; and
selecting the second set of motion detection criteria that is designated for use by the motion sensor device when an environmental condition at the property matches the particular environmental condition.

13. The monitoring system of claim 11, wherein the particular environmental condition comprises one or more of a lighting level, a temperature, a time of day, a day of year, a season, or a weather condition.

14. The monitoring system of claim 2, wherein determining the second set of motion detection criteria comprises setting a motion detection sensitivity in one or more segments of a field of view of the PIR sensor.

15. The monitoring system of claim 2, wherein determining the second set of motion detection criteria comprises:
analyzing the auxiliary sensor data to generate a model of a scene within a field of view of the PIR sensor; the model comprising two or more spatial segments;
classifying an object within the scene as a background object;
identifying an associated spatial segment where the background object is located in the scene; and
reducing a motion detection sensitivity of the associated spatial segment.

16. A method, comprising:
obtaining reference PIR data from a PIR sensor that has a first field of view and is configured to generate reference PIR data that represents motion within an area of the property;
determining that a first set of motion detection criteria is satisfied by the reference PIR data;
in response to determining that the first set of motion detection criteria is satisfied by the reference PIR data, activating an auxiliary sensor to cause the auxiliary sensor to generate auxiliary sensor data, wherein the auxiliary sensor has a second field of view that overlaps with the first field of view;
obtaining the auxiliary sensor data from the auxiliary sensor;
mapping the auxiliary sensor data from an area of the second field of view to a corresponding area of the first field of view;
identifying, based on the auxiliary sensor data mapped from the area of the second field of view to the corresponding area of the first field of view, an object that caused the motion detection within the area of the property;
obtaining a second set of motion detection criteria based on the reference PIR data and the identified object that caused the motion detection within the area of the property; and
determining whether the second set of motion detection criteria is satisfied by additional PIR data.

17. A non-transitory computer-readable medium storing software comprising instructions executable by one or more computers which, upon such execution, cause the one or more computers to perform operations comprising:
obtaining reference PIR data from a PIR sensor that has a first field of view and is configured to generate reference PIR data that represents motion within an area of the property;
determining that a first set of motion detection criteria is satisfied by the reference PIR data;
in response to determining that the first set of motion detection criteria is satisfied by the reference PIR data, activating an auxiliary sensor to cause the auxiliary sensor to generate auxiliary sensor data, wherein the auxiliary sensor has a second field of view that overlaps with the first field of view;
obtaining the auxiliary sensor data from the auxiliary sensor;

mapping the auxiliary sensor data from an area of the second field of view to a corresponding area of the first field of view;

identifying, based on the auxiliary sensor data mapped from the area of the second field of view to the corresponding area of the first field of view, an object that caused the motion detection within the area of the property;

obtaining a second set of motion detection criteria based on the reference PIR data and the identified object that caused the motion detection within the area of the property; and determining whether the second set of motion detection criteria is satisfied by additional PIR data.

18. The monitoring system of claim 8, wherein:

the data indicating the environmental condition at the property comprises data indicating a lighting level above a threshold lighting level; and selecting, for activation, one or more of the plurality of auxiliary sensors based on the environmental condition at the property comprises:

determining that the lighting level indicated by the data is above the threshold lighting level; and based on determining that the lighting level indicated by the data is above the threshold lighting level, selecting, for activation, a visible light camera.

19. The monitoring system of claim 8, wherein:

the data indicating the environmental condition at the property comprises data indicating a lighting level below a threshold lighting level; and selecting, for activation, one or more of the plurality of auxiliary sensors based on the environmental condition at the property comprises:

determining that the lighting level indicated by the data is below the threshold lighting level; and based on determining that the lighting level indicated by the data is below the threshold lighting level, selecting, for activation, an infrared camera.

\* \* \* \* \*